(12) United States Patent
Frankham

(10) Patent No.: US 7,748,764 B2
(45) Date of Patent: Jul. 6, 2010

(54) COMPARTMENTALISED SKIRT FOR FLATBED TRUCKS AND UTILITY VEHICLES

(76) Inventor: Robert Paul Frankham, P.O. Box 954, Burleigh Heads, Queensland 4220 (AU)

( * ) Notice: Subject to any disclaimer, the term of this patent is extended or adjusted under 35 U.S.C. 154(b) by 126 days.

(21) Appl. No.: 11/852,384

(22) Filed: Sep. 10, 2007

(65) Prior Publication Data

US 2009/0058121 A1 Mar. 5, 2009

(30) Foreign Application Priority Data

Sep. 11, 2006 (AU) .............................. 2006100764

(51) Int. Cl.
*B60R 5/00* (2006.01)

(52) U.S. Cl. ..................... 296/37.6; 296/182.1; 296/191

(58) Field of Classification Search ................ 296/37.6, 296/182.1, 191
See application file for complete search history.

(56) References Cited

U.S. PATENT DOCUMENTS

| 6,485,077 | B1 * | 11/2002 | Foster et al. | ............... 296/37.1 |
| 6,941,654 | B1 * | 9/2005 | Sears | ........................ 29/897.2 |
| 7,222,905 | B2 * | 5/2007 | Jaeck | ........................ 296/1.07 |
| 7,441,373 | B2 * | 10/2008 | Erskine | ....................... 49/409 |

* cited by examiner

Primary Examiner—Lori L Lyjak
(74) Attorney, Agent, or Firm—Young & Thompson

(57) ABSTRACT

A compartmentalised skirt for flatbed trucks and utility vehicles including in combination a skirt section for attaching to the flatbed or rear tray of a vehicle, the skirt section incorporating compartments in the skirt section which can be used for the storage of tools and equipment.

18 Claims, 7 Drawing Sheets

COMPARTMENTALISED SKIRT FOR FLATBED TRUCKS AND UTILITY VEHICLES

FIELD OF THE INVENTION

This invention relates to modifications to the body of trucks and utility vehicles in particular but not exclusively to a compartmentalised skirt for attaching to flatbed trucks and utility vehicles for the storage of tools and equipment.

BACKGROUND ART

The use of trucks and utility vehicles in various trades is well known. In particular, the use of flatbeds or rear tray vehicles introduces a problem of the storage of tools and equipment particular to the trade. The most common prior art solution is to mount a tool box against the rear of the cabin of the truck or utility vehicle. The mounting of the toolbox occupies usable space on the flatbed as well as posing problems of how to permanently mount the toolbox to the vehicle for security reasons. Commonly the toolbox is bolted through the floor of the toolbox to the flatbed of the truck or the tray of the utility.

There is therefore a need to provide a more elegant solution to secure storage of tools on a vehicle and to also provide the maximum payload space on the flatbed or tray of the truck or utility vehicle, respectively.

OBJECT OF THE INVENTION

It is therefore the object of the present invention to ameliorate some of the disadvantages to the prior art or to at least provide the public with a useful choice.

STATEMENT OF THE INVENTION

In one aspect, the invention resides in a compartmentalised skirt for flatbed trucks and utility vehicles including and in combination, a skirt section for attaching to the flatbed or rear tray of a vehicle, the skirt section incorporating compartments which can be used for the storage of tools and equipment.

Preferably, the skirt is constructed in several modules which may be assembled to form the skirt.

Preferably, the compartments include hinged doors with locks to secure any tools or equipment contained in the compartment.

Preferably, the modular sections of the skirt are fastened together by fastening means which provide a rigid structure that is attached to the undersides of the flatbed including the rear of the tray.

Preferably, a rear section or panel of the skirt incorporates housings for tail-lights and for a number plate and provides access to a spare wheel of the vehicle.

Preferably, the skirt is constructed of glass reinforced plastic, fibreglass or an equivalent material.

Preferably, the panels comprising the skirt are initially produced of a length wherein they may be cut to fit various lengths of trays or flatbeds.

Preferably, there are frangible portions which may be removed to create toolbox openings.

In a more preferred version, the skirts are adapted to house separately constructed toolboxes.

Preferably, the side skirts can be adapted to receive insertable modular compartments having a marine quality lockable door in an inner frame having an integral waterproof gasket or seal.

BRIEF DESCRIPTION OF THE DRAWINGS

In order that the invention be better understood and put into practical effect, reference ill now be made to the accompanying illustrations, wherein.

DETAILED DESCRIPTION OF THE DRAWINGS

Figure 1:
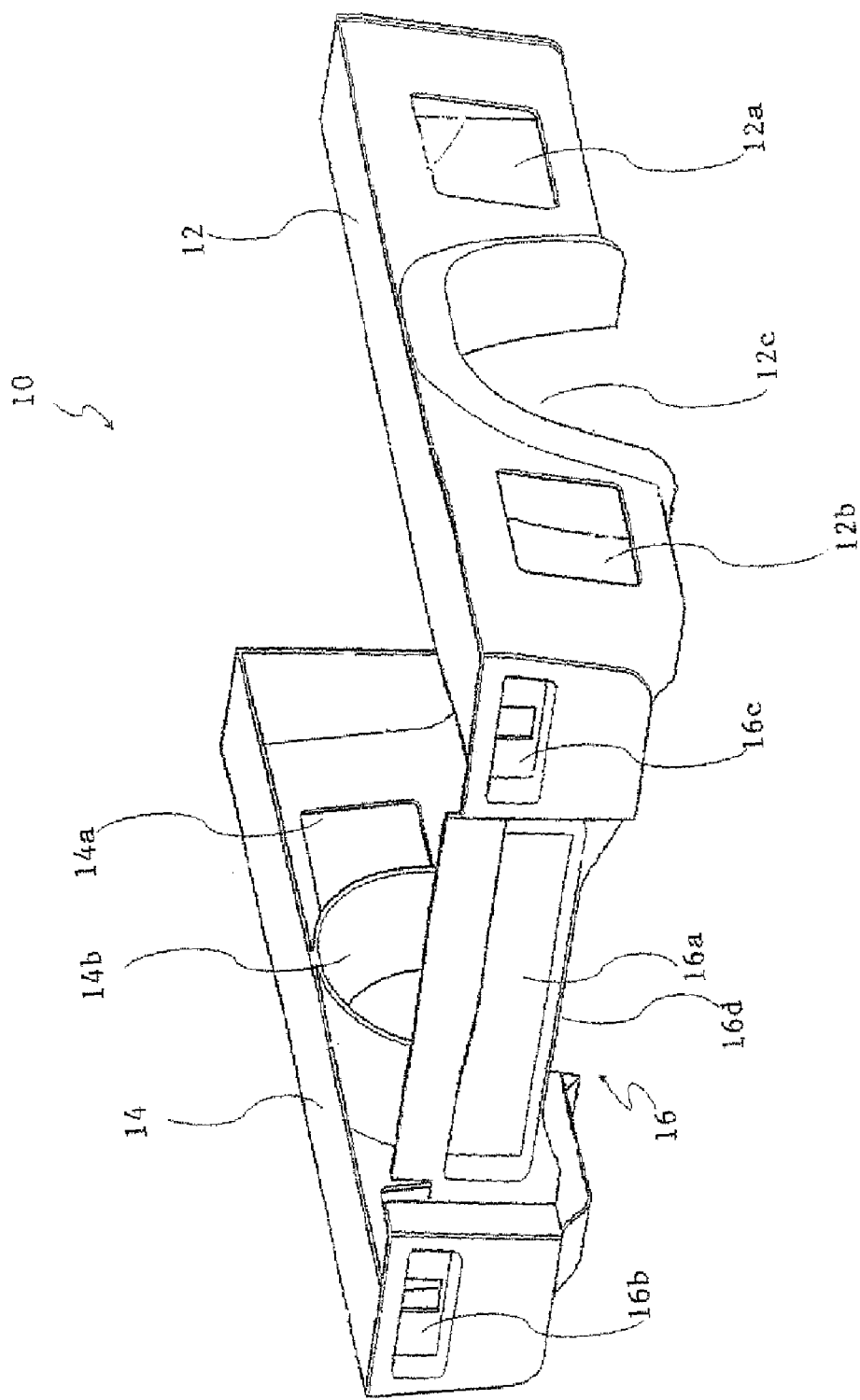
FIG. 1 shows a perspective view of a preferred embodiment invention.

Referring now to the drawings initially in FIG. 1, there is shown a perspective view of the preferred embodiment 10 according to the invention.

It is shown that the side skirts 12, 14 are attached to a rear section 16 which shows housing 16a for a number plate and rear tail lights 16b, 16c.

Figure 6:
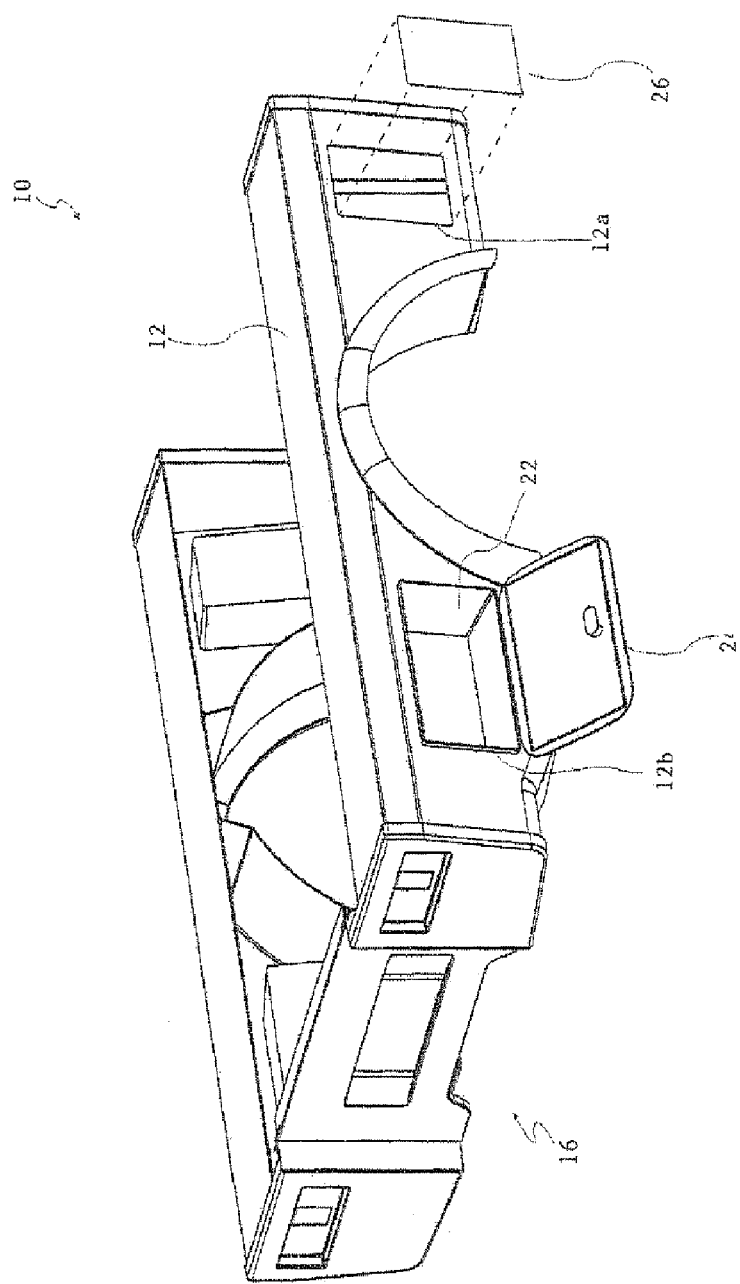
FIG. 6 shows another preferred embodiment of the invention, including a compartment with a hinged door, and a frangible portion removable to create a toolbox opening.
Figure 7:
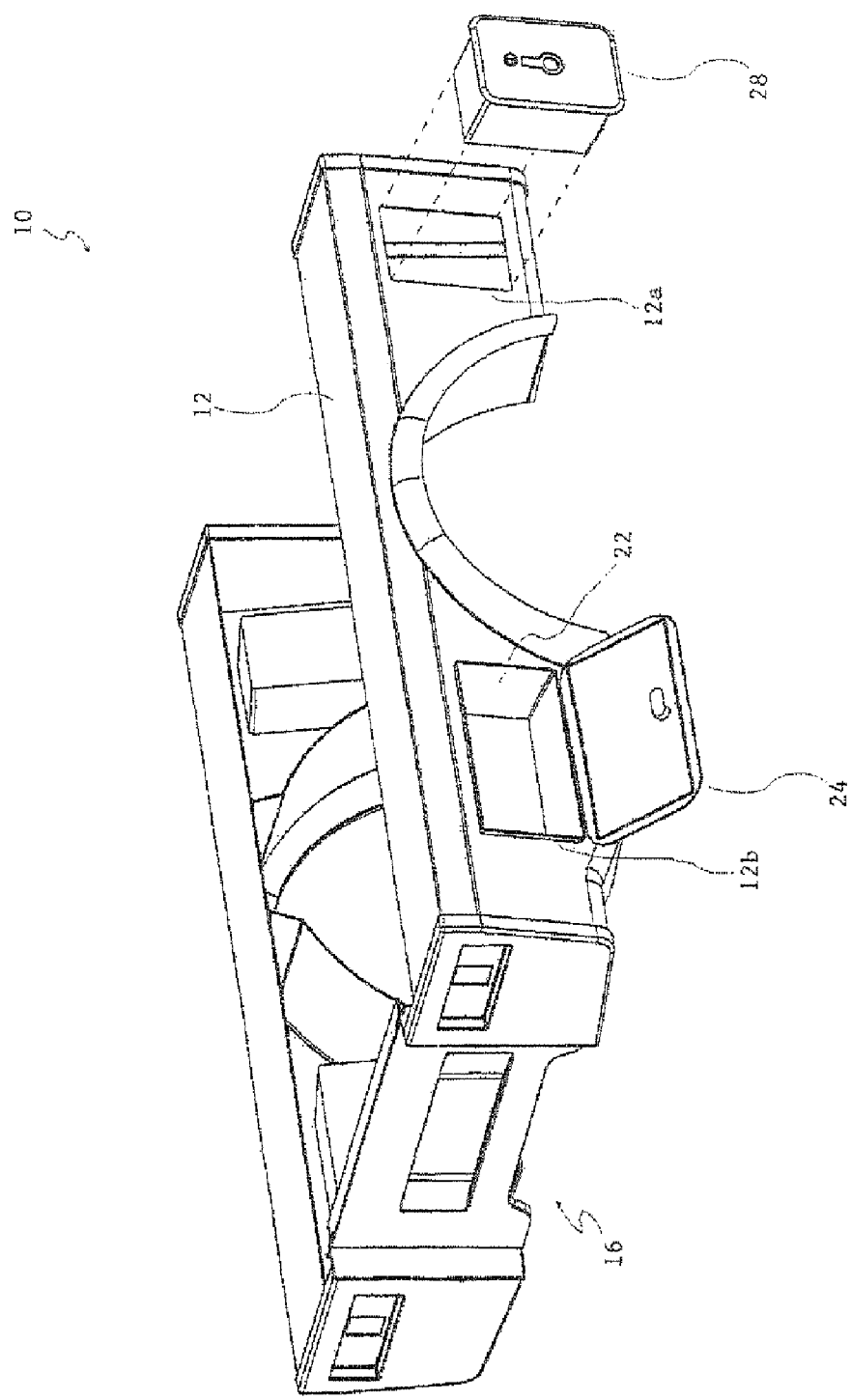
FIG. 7 shows another preferred embodiment of the invention, including a compartment with a hinged door, and an insertable modular compartment.

The side skirts 12, 14 are shown with cutout portions 12a, 12b, 14a for the insertion of modular toolboxes, accordingly to a preferred version. In one preferred version, shown in FIGS. 6 and 7, cutout portion 12b is provided with a compartmentalized toolbox 22 for tool or equipment storage, including a hinged door 24 with a lock. FIG. 6 also shows a frangible portion 26 of the side skirt 12 removable to create a toolbox opening at 12a. In the alternative, FIG. 7 shows a modular compartment 28 inserted into toolbox opening 12a. The modular compartment 28 may be provided with a marine quality lockable door in an inner frame having an integral gasket or seal. The side skirts are also shown wheel-housings 12c, 14b to accommodate the wheels (not shown) of the utility or the flatbed truck.

Access to a rear wheel (not shown) 16d is also shown provided by the rear panel 16 of the invention.

Figure 2:
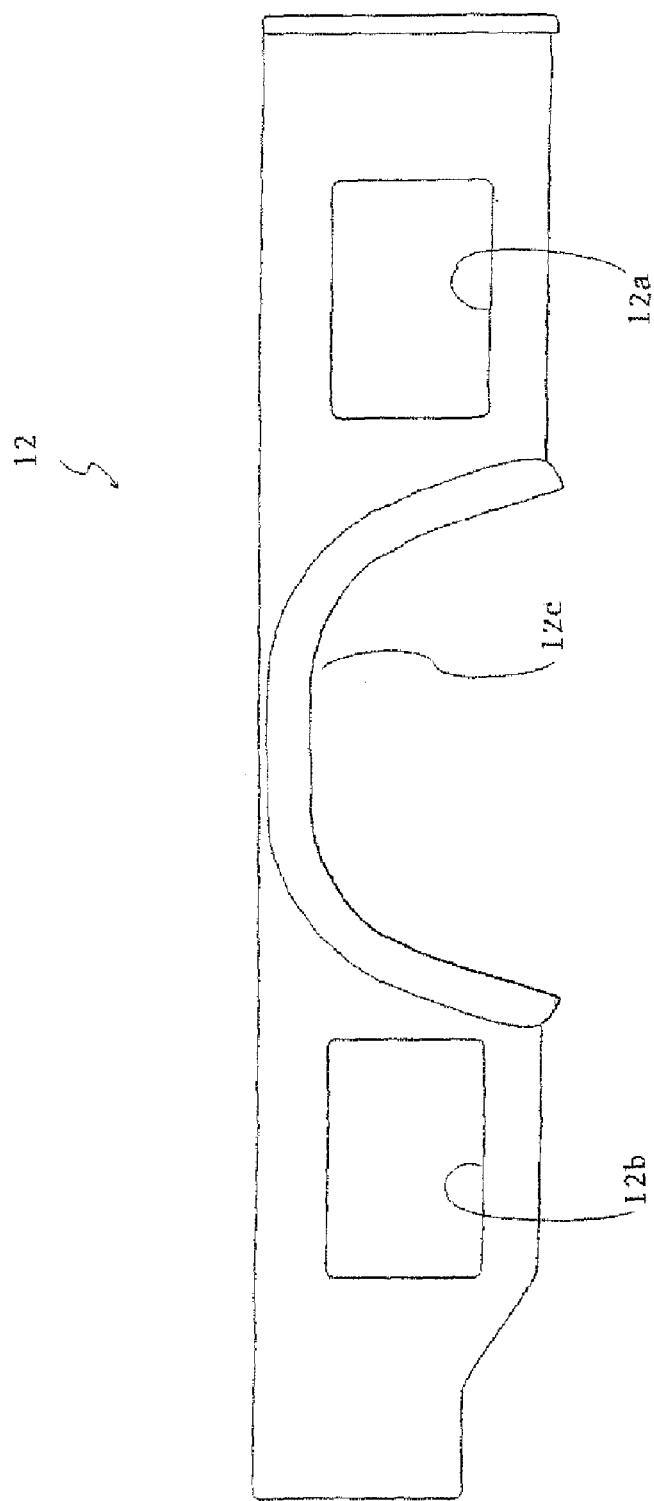
FIG. 2 shows a side elevation of the invention of FIG. 1.

Referring now to FIG. 2, there is a side elevation of the preferred skirt of FIG. 1. The representation shows the side skirt 12 having cut-outs 12a, 12b for insertion of compartmentalised or modular toolboxes on either side of the wheel arch 12c.

Figure 3:
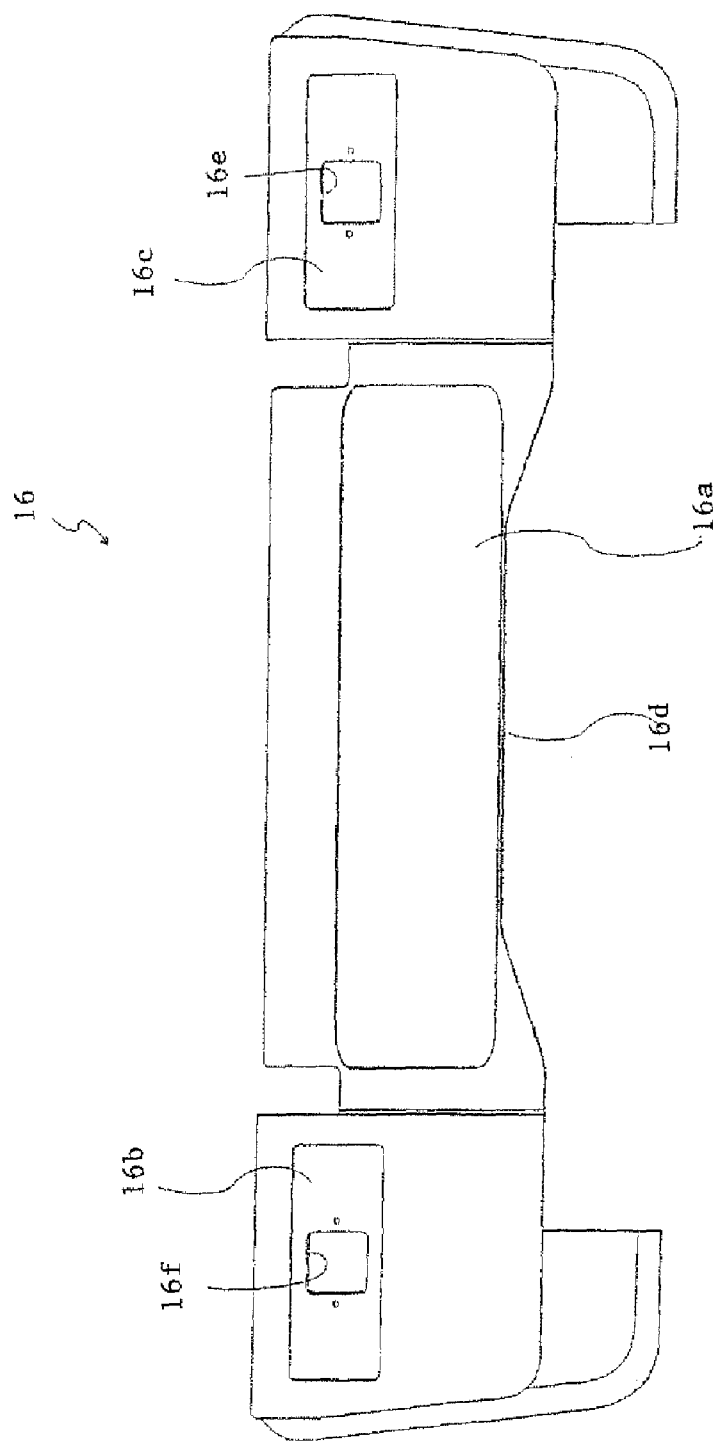
FIG. 3 shows a rear elevation of the invention of FIG. 1.

FIG. 3 shows a rear panel section 16 for attachment to the side sections of FIG. 2.

The rear panel shows a housing section 16a for a number plate and for the tail-lights 16b, 16c of the vehicle. The rear section is also indented 16d to provide access to a spare wheel of the vehicle. It will be obvious to the skilled addressee that the apertures 16e, 16f in the taillight housings can be modified to be adapted to accommodate taillights of various designs.

Figure 4:
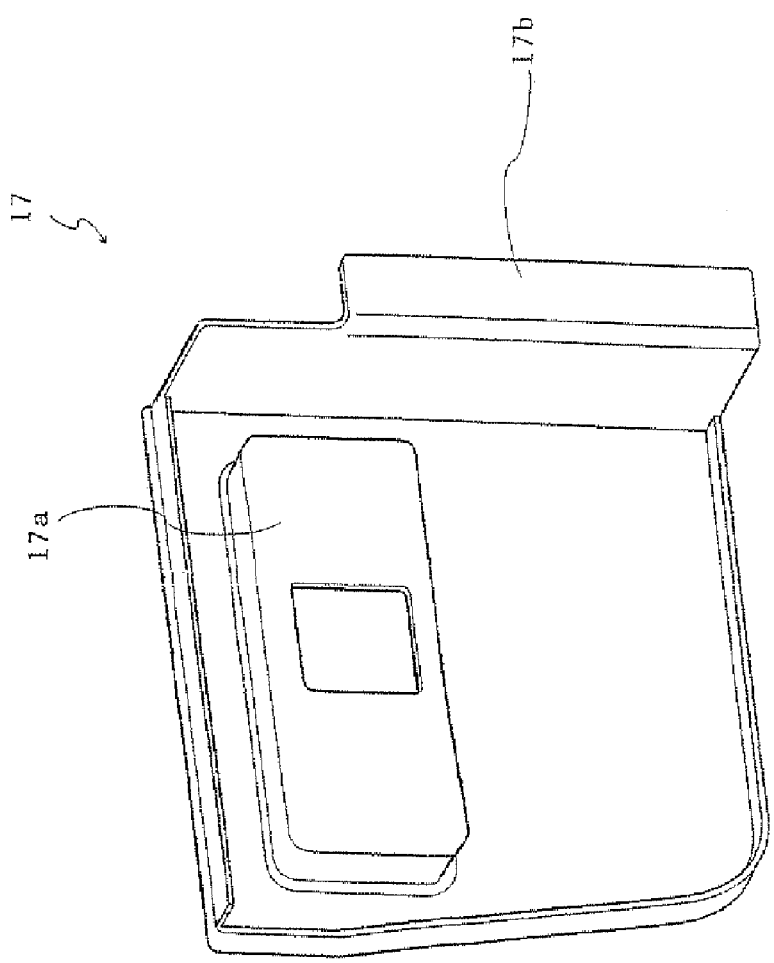
FIG. 4 shows a tail-light housing section of the rear skirt of FIG. 3.

FIG. 4 shows further detail of the tail-light section 17 of the rear panel.

As shown, the panels are constructed out of materials such as fibreglass or glass reinforced plastic which can be moulded to include recesses 17a for the accommodations of tail-lights and flat sections 17b for joining of the panels.

Figure 5:
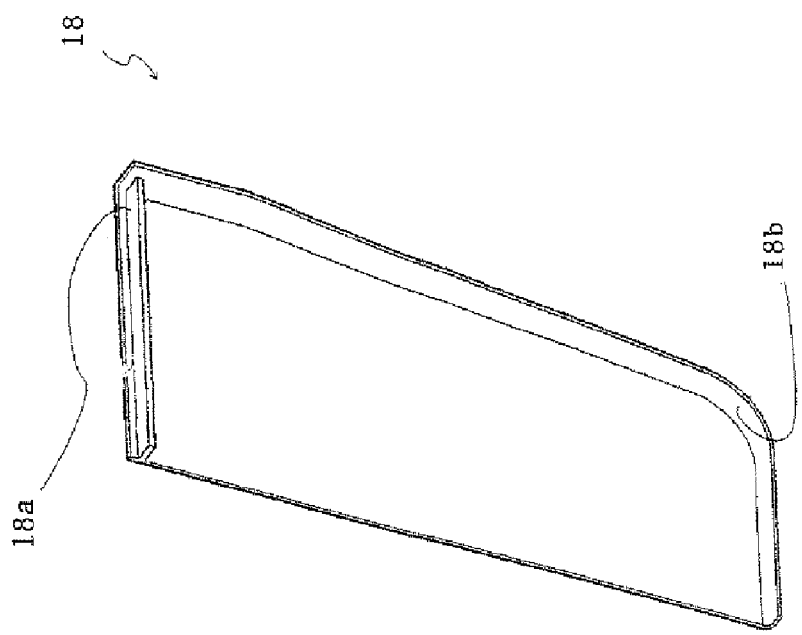
FIG. 5 shows detail of an end of the side skirt of FIG. 2.

FIG. 5 shows an end cap 18 of the side panels showing the section 18 maybe moulded with edges 18a, 18b or lugs for the attachment of the end caps to the sides. It would be obvious by the use of appropriate adhesives and fastenings that a unitary construction of relatively high strength can be obtained.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

The invention claimed is:

1. A compartmentalized skirt for flatbed trucks and utility vehicles comprising:
   a skirt section configured to be attached to a flatbed or rear tray of a vehicle, the skirt section incorporating compartments configured for storage of tools and equipment,
   wherein a rear panel of the skirt incorporates housing for tail-lights and for a number plate and provides access to a spare wheel of the vehicle.

2. A compartmentalized skirt for flatbed trucks and utility vehicles comprising:
   a skirt section configured to be attached to a flatbed or rear tray of a vehicle, the skirt section incorporating compartments configured for storage of tools and equipment,
   wherein the skirt is comprised of a plurality of modules configured to be assembled to form the skirt, and
   wherein the panels comprising the skirt are initially produced of a length wherein they may be cut to fit various lengths of trays or flatbeds.

3. A compartmentalized skirt for flatbed trucks and utility vehicles comprising:
   a skirt section configured to be attached to a flatbed or rear tray of a vehicle, the skirt section incorporating compartments configured for storage of tools and equipment,
   wherein the skirt portion comprises frangible portions removable to create toolbox openings.

4. A compartmentalized skirt for flatbed trucks and utility vehicles comprising:
   a skirt section configured to be attached to a flatbed or rear tray of a vehicle, the skirt section incorporating compartments configured for storage of tools and equipment,
   wherein the skirt section comprises:
   a rear section (16), with a first rear section (16a) configured to house a number plate and a second rear section (16b, 16c) configured to house tail lights, and with an indentation (16d) configured to provide access to a spare wheel of the vehicle;
   a first side skirt (12) attached to the rear section (16); and
   a second side skirt (14) attached to the rear section (16),
   wherein each of said first side skirt (12) and said second side skirt (14) comprise at least one cutout configured for storage of tools and equipment.

5. The compartmentalized skirt for flatbed trucks and utility vehicles as claimed in claim 4, wherein the second rear section (16b, 16c) comprises apertures (16e, 16f) configured to accommodate tail-lights.

6. The compartmentalized skirt for flatbed trucks and utility vehicles as claimed in claim 4, wherein the rear section (16) comprises a first and second moulded panel,
   each of said first and second molded panel having a recess (17a) configured to receive a tail light of the vehicle and a flat section (17b) configured to join with one of the first and the second side skirt (12, 14).

7. The compartmentalized skirt for flatbed trucks and utility vehicles as claimed in claim 6, wherein the recess (17a) comprises a center section with an orifice extending therethrough.

8. The compartmentalized skirt for flatbed trucks and utility vehicles as claimed in claim 4, wherein each side skirt (12, 14) comprises an end cap (18) comprised of a main portion, first edge (18a) extending perpendicularly from said main portion, and a second edge (18b) extending from a perimeter of said main portion.

9. The compartmentalized skirt for flatbed trucks and utility vehicles as claimed in claim 4, wherein each of said first side skirt (12) and said second side skirt (14) comprise a wheel arch (12c) configured to accommodate wheels of the vehicle.

10. The compartmentalized skirt for flatbed trucks and utility vehicles as claimed in claim 9,
    wherein each of said first side skirt (12) and said second side skirt (14) further comprise a first side panel at a first side of said wheel arch (12c), and a second side panel at a second side of said wheel arch (12c),
    wherein said first side panel has a first cutout (12a) through said first side panel, and said second side panel has a second cutout (12b) through said second side panel.

11. A compartmentalized skirt for flatbed trucks and utility vehicles comprising:
    a skirt section configured to be attached to a flatbed or rear tray of a vehicle, the skirt section incorporating compartments configured for storage of tools and equipment,
    wherein the skirt section comprises a side skirt comprised of removable frangible portions to form an opening to accommodate a toolbox.

12. A compartmentalized skirt for flatbed trucks and utility vehicles, comprising:
    a skirt section configured to be attached to a flatbed or rear tray of a vehicle,
    wherein the skirt section comprises:
    side skirts adapted to house separately constructed toolboxes;
    a rear section (16), with a first rear section (16a) configured to house a number plate and a second rear section (16b, 16c) configured to house tail lights, and with an indentation (16d) configured to provide access to a spare wheel of the vehicle;
    a first side skirt (12) attached to the rear section (16); and
    a second side skirt (14) attached to the rear section (16),
    wherein each of said first side skirt (12) and said second side skirt (14) comprise at least one cutout configured to house the separately constructed toolboxes.

13. A compartmentalized skirt for flatbed trucks and utility vehicles, comprising:
    a skirt section configured to be attached to a flatbed or rear tray of a vehicle,
    wherein the skirt section comprises:
    side skirts adapted to receive an insertable modular compartment equipped with a lockable door;
    a rear section (16), with a first rear section (16a) configured to house a number plate and a second rear section (16b, 16c) configured to house tail lights, and with an indentation (16d) configured to provide access to a spare wheel of the vehicle;

a first side skirt (12) attached to the rear section (16); and a second side skirt (14) attached to the rear section (16), wherein each of said first side skirt (12) and said second side skirt (14) comprise at least one cutout configured receive the insertable modular compartments.

14. The compartmentalized skirt for flatbed trucks and utility vehicles as claimed in claim 1, wherein the compartments include hinged doors with locks to secure the tools and equipment inside the compartment.

15. The compartmentalized skirt for flatbed trucks and utility vehicles as claimed in claim 2, wherein the compartments include hinged doors with locks to secure the tools and equipment inside the compartment.

16. The compartmentalized skirt for flatbed trucks and utility vehicles as claimed in claim 3, wherein the compartments include hinged doors with locks to secure the secure tools and equipment inside the compartment.

17. The compartmentalized skirt for flatbed trucks and utility vehicles as claimed in claim 4, wherein the compartments include hinged doors with locks to secure the secure tools and equipment inside the compartment.

18. The compartmentalized skirt for flatbed trucks and utility vehicles as claimed in claim 11, wherein the compartments include hinged doors with locks to secure the secure tools and equipment inside the compartment.

* * * * *